United States Patent
Krishnamurthy

(10) Patent No.: US 9,323,771 B2
(45) Date of Patent: Apr. 26, 2016

(54) EFFICIENT RENAME IN A LOCK-COUPLED TRAVERSAL OF B+TREE

(71) Applicant: Dell Products, LP, Round Rock, TX (US)

(72) Inventor: Saikrishnan Krishnamurthy, Nashua, NH (US)

(73) Assignee: Dell Products, LP, Round Rock, TX (US)

( * ) Notice: Subject to any disclaimer, the term of this patent is extended or adjusted under 35 U.S.C. 154(b) by 334 days.

(21) Appl. No.: 13/869,815

(22) Filed: Apr. 24, 2013

(65) Prior Publication Data

US 2014/0324925 A1    Oct. 30, 2014

(51) Int. Cl.
*G06F 17/30* (2006.01)

(52) U.S. Cl.
CPC ............................. *G06F 17/30117* (2013.01)

(58) Field of Classification Search
CPC ................................................. G06F 17/30117
USPC .................................................. 707/821, 822
See application file for complete search history.

(56) References Cited

U.S. PATENT DOCUMENTS

| | | | | |
|---|---|---|---|---|
| 5,123,104 | A * | 6/1992 | Levine | G06F 17/30348 |
| 5,475,837 | A * | 12/1995 | Ishak | G06F 12/023 |
| 6,671,694 | B2 * | 12/2003 | Baskins | G06F 17/30961 |
| 7,222,119 | B1 * | 5/2007 | Ghemawat et al. | |
| 7,240,114 | B2 * | 7/2007 | Karamanolis et al. | 709/225 |
| 7,370,055 | B1 | 5/2008 | Pande | |
| 7,426,653 | B2 * | 9/2008 | Hu et al. | 714/4.4 |
| 7,454,408 | B2 * | 11/2008 | Koffron | |
| 7,483,906 | B2 | 1/2009 | MacCormick | |
| 7,577,658 | B2 | 8/2009 | Graefe | |
| 7,953,717 | B2 | 5/2011 | Graefe | |
| 8,078,642 | B1 * | 12/2011 | Poutanen | G06F 17/30864 |
| | | | | 707/706 |
| 8,086,581 | B2 | 12/2011 | Oshri et al. | |
| 8,176,023 | B2 | 5/2012 | Graefe | |
| 8,209,515 | B2 | 6/2012 | Schott | |
| 8,478,799 | B2 * | 7/2013 | Beaverson et al. | 707/823 |
| 8,959,118 | B2 * | 2/2015 | Anderson | G06F 17/30091 |
| | | | | 707/736 |
| 2008/0086470 | A1 | 4/2008 | Graefe | |
| 2009/0271408 | A1 | 10/2009 | Graefe | |
| 2010/0106696 | A1 * | 4/2010 | Tamas et al. | 707/704 |
| 2010/0191693 | A1 * | 7/2010 | Su et al. | 706/50 |
| 2011/0055184 | A1 * | 3/2011 | Buban et al. | 707/704 |
| 2011/0208704 | A1 * | 8/2011 | Graefe | 707/696 |
| 2012/0072763 | A1 * | 3/2012 | Lu et al. | 714/2 |
| 2013/0185271 | A1 * | 7/2013 | Strain et al. | 707/704 |

(Continued)

OTHER PUBLICATIONS

Primmer, R., "Distributed Object Store Principles of Operation: The Case for Intelligent Storage," White Paper, Hitachi Data Systems Corporation, (Jul. 2010).

(Continued)

*Primary Examiner* — Miranda Le
(74) *Attorney, Agent, or Firm* — Hamilton, Brook, Smith & Reynolds, P.C.

(57) ABSTRACT

Highly concurrent systems use lock-coupling for tree traversal wherein only two levels (parent and current) are locked at any time. The parent lock is released as soon as successful lock is attained on the grandchild. The rename technique described here facilitates using finer grained locking and multiple path traversals by changing lock ownerships.

16 Claims, 5 Drawing Sheets

(56) References Cited

U.S. PATENT DOCUMENTS

| | | | | |
|---|---|---|---|---|
| 2013/0204902 A1* | 8/2013 | Wang | ............... | G06F 17/30327 707/797 |
| 2013/0262865 A1* | 10/2013 | Irvine | ........................ | 713/165 |
| 2013/0339406 A1* | 12/2013 | Kanfi | ............... | G06F 17/30082 707/825 |
| 2014/0074841 A1* | 3/2014 | Majnemer et al. | ............ | 707/737 |
| 2014/0279859 A1* | 9/2014 | Benjamin-Deckert | ............ | G06F 17/30327 707/609 |

OTHER PUBLICATIONS

Rodeh, O., "B-trees, Shadowing, and Clones," *ACM Transactions on Storage*, 3(4) Article 2, (Feb. 2008).

\* cited by examiner

EFFICIENT RENAME IN A LOCK-COUPLED TRAVERSAL OF B+TREE

BACKGROUND

File systems generally require coarse locking of folders and directories to ensure that changes made to files are made in order and one at a time. This coarse locking reduces concurrency because a significant amount of data becomes unnecessarily locked. Coarse locking is particularly unsuited for distributed file systems where more than one user may access the same set of files within a folder.

SUMMARY

The present invention addresses disadvantages of the prior art and provides efficient renaming of files. Methods and systems described herein represent a namespace of a file system in a tree structure (e.g., a B+tree). The tree structure may be formed of a plurality of nodes, at least some nodes representing respective filenames in the file system. Each node holds a key of a respective filename. Embodiments rename a first key with a second key in the tree structure by employing lock coupling in traversing the tree structure. In particular, the rename process may include locking a subject node and the parent node, and holding, in a first state machine, a lock of the parent node and traversing the tree structure. Beginning from the subject node, the first state machine traverses the tree structure using lock-coupling and searches for the first and second keys. Upon divergence of the first and second keys, embodiments generate two independent paths of traversal. In particular, the rename process pauses (suspends) the first state machine and creates a second state machine traversing the tree structure beginning from the subject node, using lock coupling and searching for the first key. And the rename process creates a third state machine to traverse the tree structure, beginning from the parent node of the subject node, using lock coupling and searching for the second key. In this manner, two independent paths from the subject node to succeeding nodes in respective paths of traversal by the second and third state machines result, and the first state machine waits until the second and third state machines complete.

Embodiments may include the second state machine requesting the lock from the first state machine for at least one node along at least one execution path prior to modifying the at least one node. The rename methods and systems may grant to the second state machine the lock for the at least one node prior to modifying the at least one node. In one embodiment, one or more additional state machines may be queued behind the first state machine until the first state machine releases the lock for the parent node. Embodiments may include comparing first and second keys of said renaming against a minimum key for each node in the respective paths of traversal and determining whether the first and second keys diverge at a given node. Upon determining that the first and second keys diverge at the given node, methods and systems described herein create separate execution paths for traversal.

Embodiments may include generating a first additional state machine and assigning to the first additional state machine a current lock of the given node. The methods and systems may include generating a second additional state machine and assigning to the second additional state machine the lock of a parent node of the given node. The first and second additional state machines may be assigned respective ones of the separate execution paths for traversal, wherein the parent node (of the given node) state machine transitions to a pending state waiting for the first additional and second additional state machines to complete.

Methods and systems may include determining traversal completion of an execution path upon locking a leaf index node. In one embodiment, the methods and systems may store an address of a locked leaf node in the parent state machine or first state machine. Embodiments may include checking, by at least one of the two additional state machines, whether a requested lock is held by the other state machine. In this manner, the methods and systems described below prevent a deadlock by returning control to the parent node (of the leaf node) state machine without attempting to lock (again) the locked leaf node.

Upon traversal completion of the second and third state machine, control may transfer to the first state machine and the process may modify a namespace. In one embodiment, the namespace may be modified by deleting the first key, inserting the second key and moving a data pointer from the first key to the second key, wherein moving the data pointer includes referencing a memory address associated with the second key. Methods and systems may then release locks held on the (leaf) nodes of the first and second keys after moving the data pointer from the first key to the second key.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
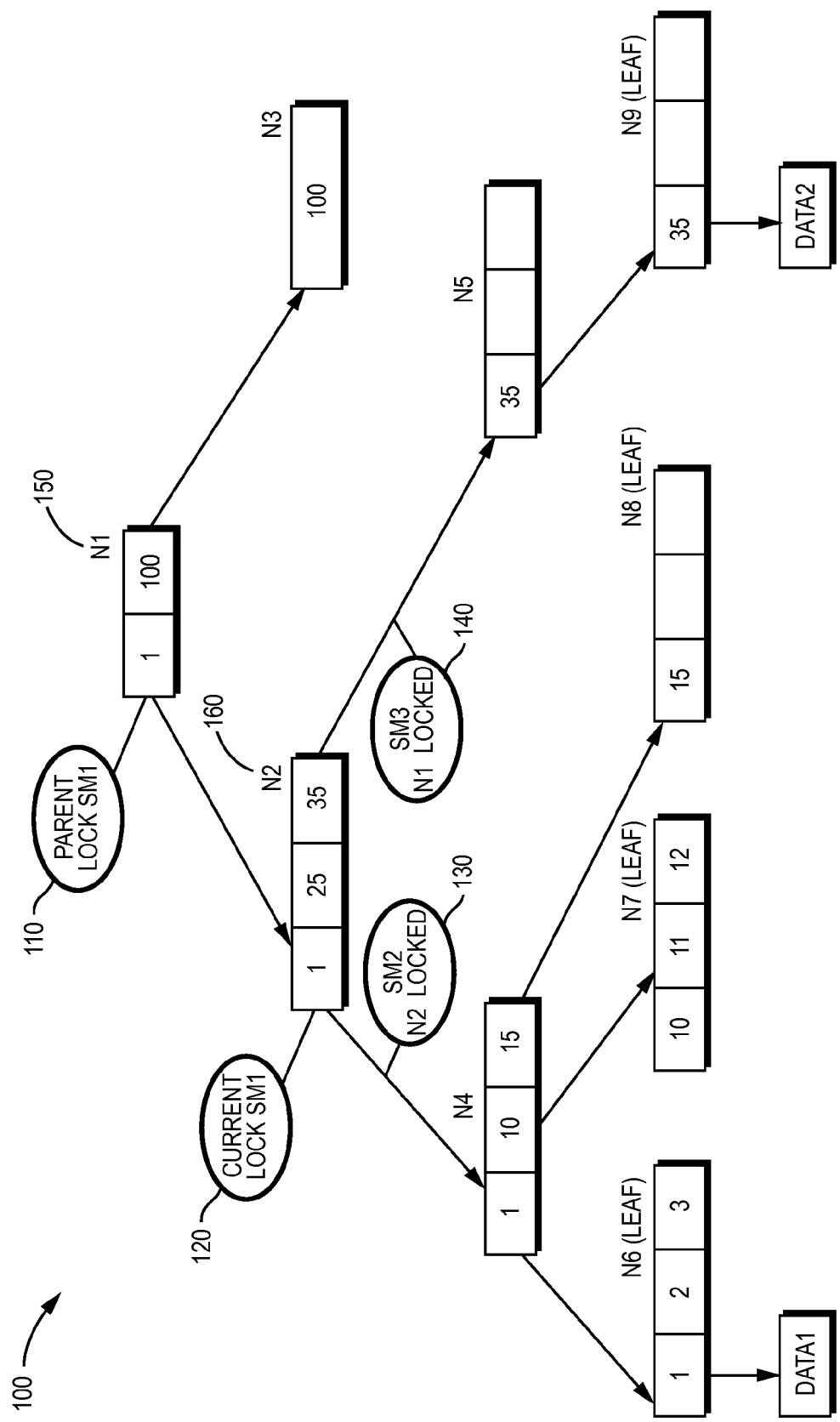
FIG. 1 is a schematic diagram representing a tree structure with lock coupling according to one embodiment.

A description of embodiments follows.

Rename is a file-system operation that takes two identifiers—source and destination, and replaces the source identifier with the destination identifier in the file system or namespace. File systems manage a set of files by providing access, storage and modification to those files and their locations. In one embodiment, a file system may include a Comprehensive Versioning FileSystem (CVFS), ZFS, WAFL filing system and/or the like. Some file systems include file system and logical volume managers. Features of combined file systems include integration of volume management, snapshots and clones. A namespace is a data construct for organizing a group of assemblies, classes or types of data structures. In one embodiment, a namespace may act as a container (such as a directory or folder) for classes organized as groups usually based on functionality.

B-trees are used by several filesystems to represent files and directories. B-trees are balanced search trees designed to work well on magnetic disks or other direct-access secondary storage devices. B-trees are similar to red-black trees, but they are better at minimizing disk I/O operations. B-trees differ from red-black trees in that B-tree nodes may have many children, from a handful to thousands. That is, the branching factor of a B-tree can be quite large, although the branching factor is usually determined by characteristics of the disk unit used. B-trees are similar to red-black trees in that every N-node B-tree has height O (lg n), overall height of a B-tree can be considerably less than that of a red-black tree because the branching factor can be much larger.

The B-tree variant typically used by filesystems is the B+-tree. A B+-tree leaf node contains data values and internal nodes contain only indexing keys. Files are typically represented by B+-trees that hold disk-extents interleaves. Directories are represented by B+-trees that contain variable sized directory trees and leaves. In one embodiment, a B+-tree used with a filesystem is persistent and recoverable. In one embodiment, a B+-tree leaf node may contain key-data pairs and an index node contains mappings between keys and child nodes. In one embodiment, individual nodes may take up approximately 4 KB of disk-space. To modify a single path in a B-tree, regular B-trees shuffle keys between neighboring leaf nodes for re-balancing purposes after a remove-key operation.

Namespaces may also be represented by a B-tree or a B+-tree. The rename operation performs a delete and an insert in the namespace tree. In one embodiment, the file-system locks the root of the namespace tree when performing renames to simplify the task of dealing with merging and splitting nodes in the same transaction.

A state machine may be used to assist maintaining file systems represented as B+-trees. A state machine may be understood as a mathematical model of computation used to design computer programs and sequential circuits. In one embodiment, the state machine may be an abstract machine that can be in one of a finite number of states. A finite state machine may only be in one state at a given time, the current state changes in the state machines state may be initiated by an event or condition called a transition.

Multi-threaded applications may typically use state-machines (SM) for providing concurrency. Each SM owns a thread resource and describes a single path of execution. When traversing a B+-tree, each SM follows a path described by the key it is attempting to locate. An SM must lock a node in exclusive-mode before modifying it. Other SMs attempting to lock the same node will be queued behind the SM holding an exclusive lock. No request priority is assumed so locks are granted to SMs in the same order in which they were requested.

FIG. 1 is a schematic diagram representing a tree structure with lock coupling according to one embodiment. A rename SM (SM1) 110 starts traversing a B+-tree 100 using lock-coupling with a goal of renaming key-1 with key-35 and locks are held at nodes N1 150 and N2 160. Due to lock-coupling, a proactive split is performed at each node in the path of traversal. The traversal proceeds using a range lookup of keys 1 thru 35. An SM traversal is said to be complete when the leaf index node is successfully locked.

SM1 110, 120 compares the source (first) and destination (second) keys of rename against the minimum key of each node deciding if the keys diverge to warrant creating separate execution paths. At N2 160 the 2 keys take different paths of execution so two new SMs are created—SM2 130 and SM3 140. In one embodiment, SM1 could continue and reach the leaf node using a single path of execution if the two keys happen to be in the same leaf-node.

SM2 130 is created and the N2 160 lock ownership is transferred to it. This SM 130 will proceed with intent to delete the source key-1. The lock ownership of N1 150 is transferred to SM3 140 which proceeds with intent to insert the destination key-35. Lock ownership transfer ensures that a later transaction does not get in between these two SM execution paths. Since transactions are committed in order, the current transaction does not pick up changes made by a later transaction.

SM1 110, 120 will kick-off SM2 130 and SM3 140 to continue traversing the B+-tree 100 and pend itself until the two state-machines complete their execution paths. Although there are two paths of execution, SM2 130 and SM3 140 are still related because a failure in either path must cause a failure in the rename operation. For example, a delete path may not find key-1 and insert path might find key-35 already exists.

Due to merging of nodes it is still possible for the two execution paths to land on the same leaf-node. To avoid deadlock, SM2 may save the address of the locked leaf-node in SM1 (parent) 110. During its traversal, SM3 may check with SM1 if the address it is trying to lock has already been locked by SM2. If so, SM3 may complete and return control back to SM1 without attempting to lock that node. This avoids potential deadlock between two related execution paths.

When both SM2 and SM3 completes, SM1 110 (parent) may continue execution. If an error is set in either execution paths, the transaction is committed and an error is returned for the rename operation. If both paths succeed, SM1 may perform the rename in two steps. The first step involves modifying the namespace by deleting the source key-1 and inserting destination key-35. In the second step, the data pointer is moved from key-1 and added to key-35. Locks held on the source and destination can be released after renaming.

In one embodiment, transaction commits all the modified extents, frees deleted extents and returns status back to the caller. Since locks may be restricted to two levels (e.g., N1 level and N2/N3 level), there could be other transactions using the COW'ed extents during rename. This may result in a transaction being committed even when rename fails because of an error during rename.

Figure 2:
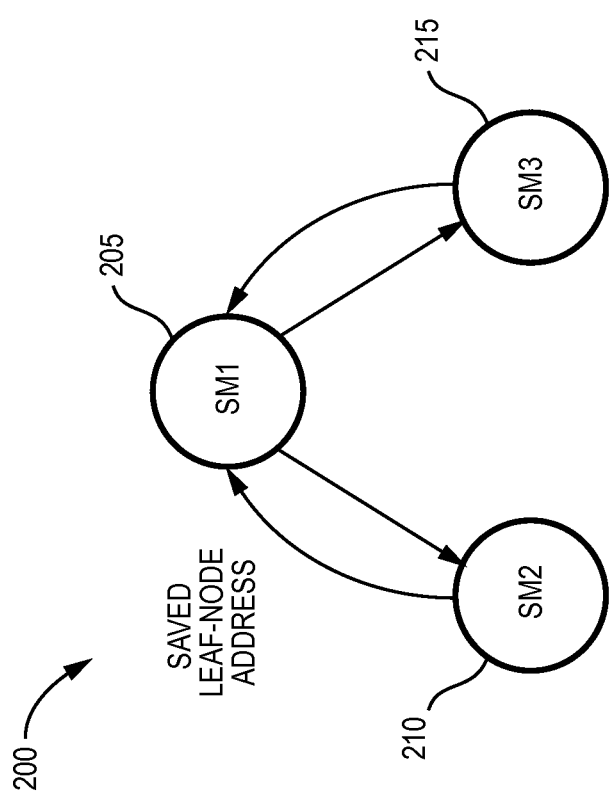
FIG. 2 is a schematic diagram representing state machines for efficient rename in a lock-coupled traversal according to one embodiment.

FIG. 2 is a schematic diagram representing state machines for efficient rename in a lock-coupled traversal. As illustrated in FIG. 2, three state machines, state machine (SM1) 205, state machine (SM2) 210, and state machine (SM3) 215 communicate to provide an efficient rename in a lock-coupled traversal. As described with reference to FIG. 1, two execution paths may fall on the same leaf node due to merging of the nodes. In an effort to avoid deadlock, SM2 210 may transmit to SM1 205 the address of a saved leaf-node. When SM3 215 traverses its respective execution path, SM3 215 may transmit a message to determine if SM1 205 holds the address that SM3 215 is attempting to lock through a lock request. If SM1 205 received a request to save the leaf node by SM2 210, a lock will not be attempted by SM3 and thereby avoiding deadlock.

Figure 3:
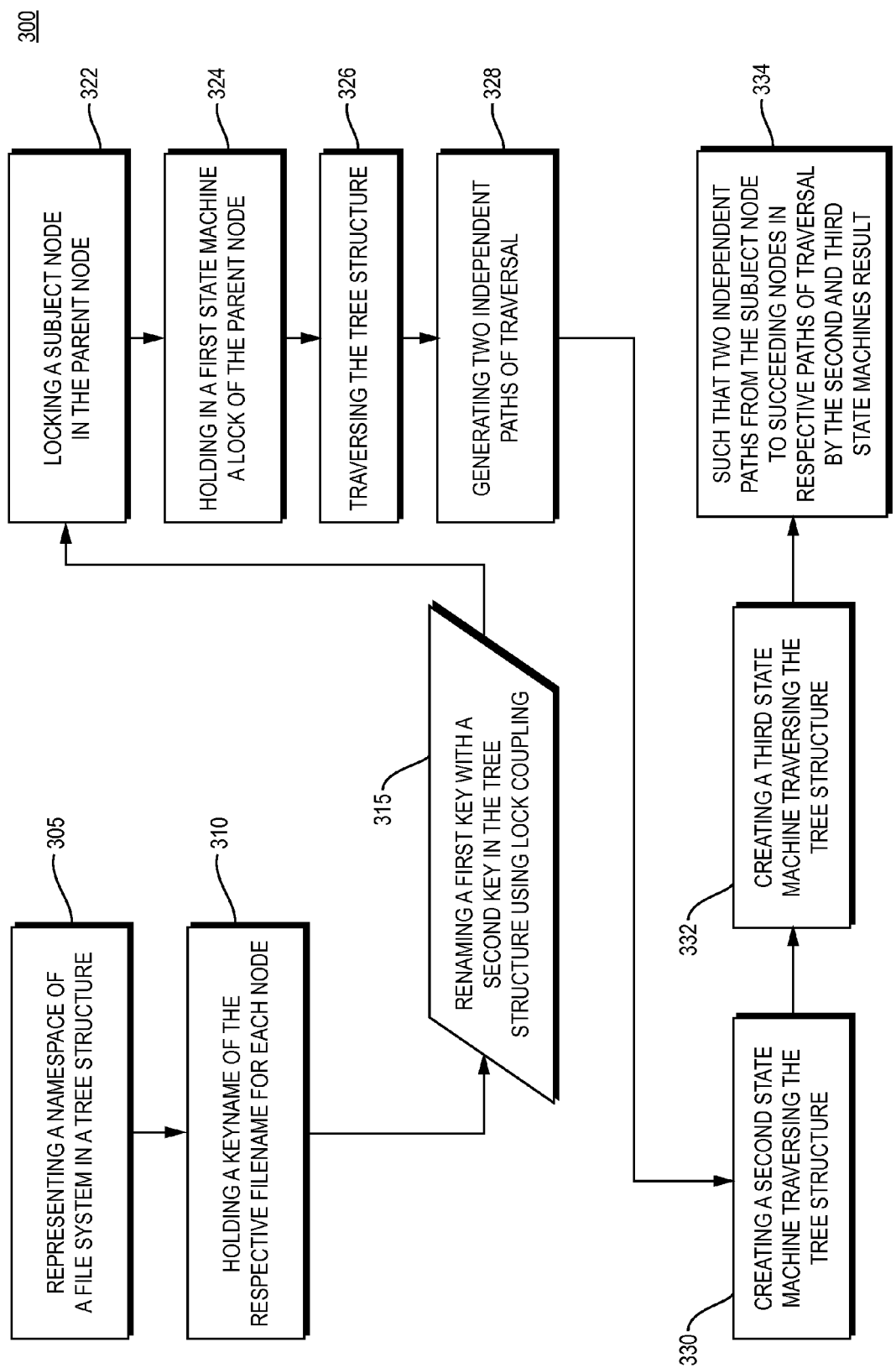
FIG. 3 is a flow diagram representing a process for efficient rename according to one embodiment.

FIG. 3 is a flow diagram representing a process for efficient rename according to one embodiment. The flow diagram 300 may include representing a name space of a file system in a tree structure 305. In one embodiment, the process of efficient renaming includes holding a keyname of the respective filename for each node 310. As illustrated in FIG. 3, the flow diagram 300 may include renaming a first key with a second key in the tree structure using lock coupling 315. According to one embodiment, lock coupling 320 may include locking a subject node in the parent node 322, holding in a first state machine a lock at the parent node 324.

The efficient rename process may traverse the tree structure 326. For example, the traversal may begin from the subject node, using lock coupling and search for the first and second keys. Upon divergence of the first and second keys, the method may generate two independent paths of traversal 328. In one embodiment, generating two independent paths of traversal may include creating a second state machine 330 traversing the tree structure, beginning from the subject node, using lock coupling and searching for the first key. Generating two independent paths of traversal may also include creating a third state machine 332 traversing the tree structure, beginning from the parent node of the subject node, using lock coupling and searching for the second key. The efficient rename process may perform the described operations such that two independent paths from the subject node to succeeding nodes in respective paths of traversal by the second and third state machines result, and the first state machine waits until the second and third state machines complete 334.

Figure 4:
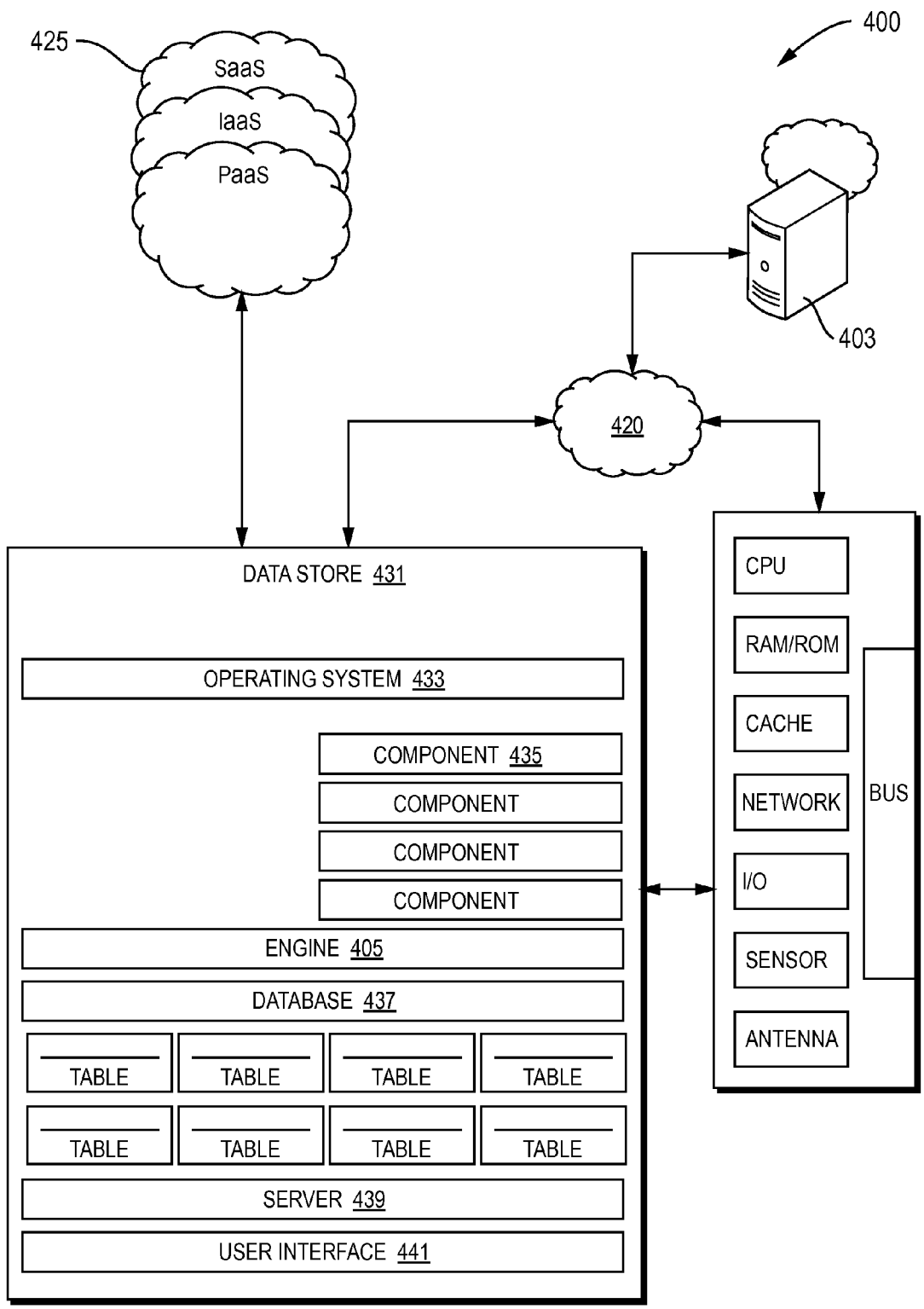
FIG. 4 is a schematic diagram of a computer system for efficient rename in a lock-coupled traversal according to one embodiment.

FIG. 4 is a schematic diagram of a computer system for efficient rename in a lock-coupled traversal. The computer system of FIG. 4 may serve to aggregate, process, store, search, serve, identify, instruct, generate, match, and/or facilitate interactions with a computer. Computers employ processors to process information; such processors may be referred to as central processing units (CPU). CPUs use communicative circuits to pass binary encoded signals acting as instructions to enable various operations. These instructions may be operational and/or data instructions containing and/or referencing other instructions and data in various processor accessible and operable areas of memory. Such instruction passing facilitates communication between and among one or more virtual machines, one or more instances of the efficient rename engine, one or more efficient rename engine components, as well as third party applications. Should processing requirements dictate a greater amount speed and/or capacity, distributed processors (e.g., Distributed Cache) mainframe, multi-core, parallel, and/or super-computer architectures may similarly be employed. Alternatively, should deployment requirements dictate greater portability, mobile device(s), tablet(s) Personal Digital Assistants (PDAs) may be employed.

The host(s), client(s) and storage array(s) may include transceivers connected to antenna(s), thereby effectuating wireless transmission and reception of various instructions over various protocols; for example the antenna(s) may connect over Wireless Fidelity (WiFi), BLUETOOH, Wireless Access Protocol (WAP), Frequency Modulation (FM), or Global Positioning System (GPS). Such transmission and reception of instructions over protocols may be commonly referred to as communications. In one embodiment, the efficient rename engine may facilitate communications through a network 420 between or among the hypervisor and other virtual machines. In one embodiment, other components may be provisioned as a service. The service may include a Platform-as-a-Service (PaaS) model layer, an Infrastructure-as-a-Service (IaaS) model layer and a Software-as-a-Service (SaaS) model layer. The SaaS model layer generally includes software managed and updated by a central location, deployed over the Internet and provided through an access portal. The PaaS model layer generally provides services to develop, test, deploy, host and maintain applications in an integrated development environment. The IaaS layer model generally includes virtualization, virtual machines, e.g., virtual servers, virtual desktops and/or the like.

Depending on the particular implementation, features of the efficient rename system and components of efficient rename engine may be achieved by implementing a specifically programmed microcontroller. Implementations of the computer system and functions of the components of the efficient rename engine include specifically programmed embedded components, such as: Application-Specific Integrated Circuit ("ASIC"), Digital Signal Processing ("DSP"), Field Programmable Gate Array ("FPGA"), and/or the like embedded technology. For example, any of the efficient rename system Engine Set 505 (distributed or otherwise) and/or features may be implemented via the microprocessor and/or via embedded components. Depending on the particular implementation, the embedded components may include software solutions, hardware solutions, and/or some combination of both hardware/software solutions. For example, efficient rename system features discussed herein may be achieved in parallel in a multi-core virtualized environment. Storage interfaces, e.g., data store 431, may accept, communicate, and/or connect to a number of storage devices such as, but not limited to: storage devices, removable disc devices, such as Universal Serial Bus (USB), Solid State Drives (SSD), Random Access Memory (RAM), Read Only Memory (ROM), or the like.

Remote devices may be connected and/or communicate to I/O and/or other facilities of the like such as network interfaces, storage interfaces, directly to the interface bus, system bus, the CPU, and/or the like. Remote devices may include peripheral devices and may be external, internal and/or part of efficient rename engine. Peripheral devices may include: antenna, audio devices (e.g., line-in, line-out, microphone input, speakers, etc.), cameras (e.g., still, video, webcam, etc.), external processors (for added capabilities; e.g., crypto devices), printers, scanners, storage devices, transceivers (e.g., cellular, GPS, etc.), video devices (e.g., goggles, monitors, etc.), video sources, visors, and/or the like.

The memory may contain a collection of program and/or database components and/or data such as, but not limited to: operating system component, server component, user interface component 441; database component 437 and component collection 435. These components may direct or allocate resources to efficient rename engine components. A server 403 may include a stored program component that is executed by a CPU. The server may allow for the execution of efficient rename engine components through facilities such as an API. The API may facilitate communicate to and/or with other components in a component collection, including itself, and/or facilities of the like. In one embodiment, the server communicates with the efficient rename system database 437, component collection 435, a web browser, a remote client, or the like. Access to the efficient rename system database may be achieved through a number of database bridge mechanisms such as through scripting languages and through interapplication communication channels. Computer interaction interface elements such as check boxes, cursors, menus, scrollers, and windows similarly facilitate access to efficient rename engine components, capabilities, operation, and display of data and computer hardware and operating system resources, and status.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device 403. For example, a non-transient machine-readable medium may include read only memory (ROM); random access memory (RAM); magnetic disk storage media; optical storage media; flash memory devices; and others.

Figure 5:
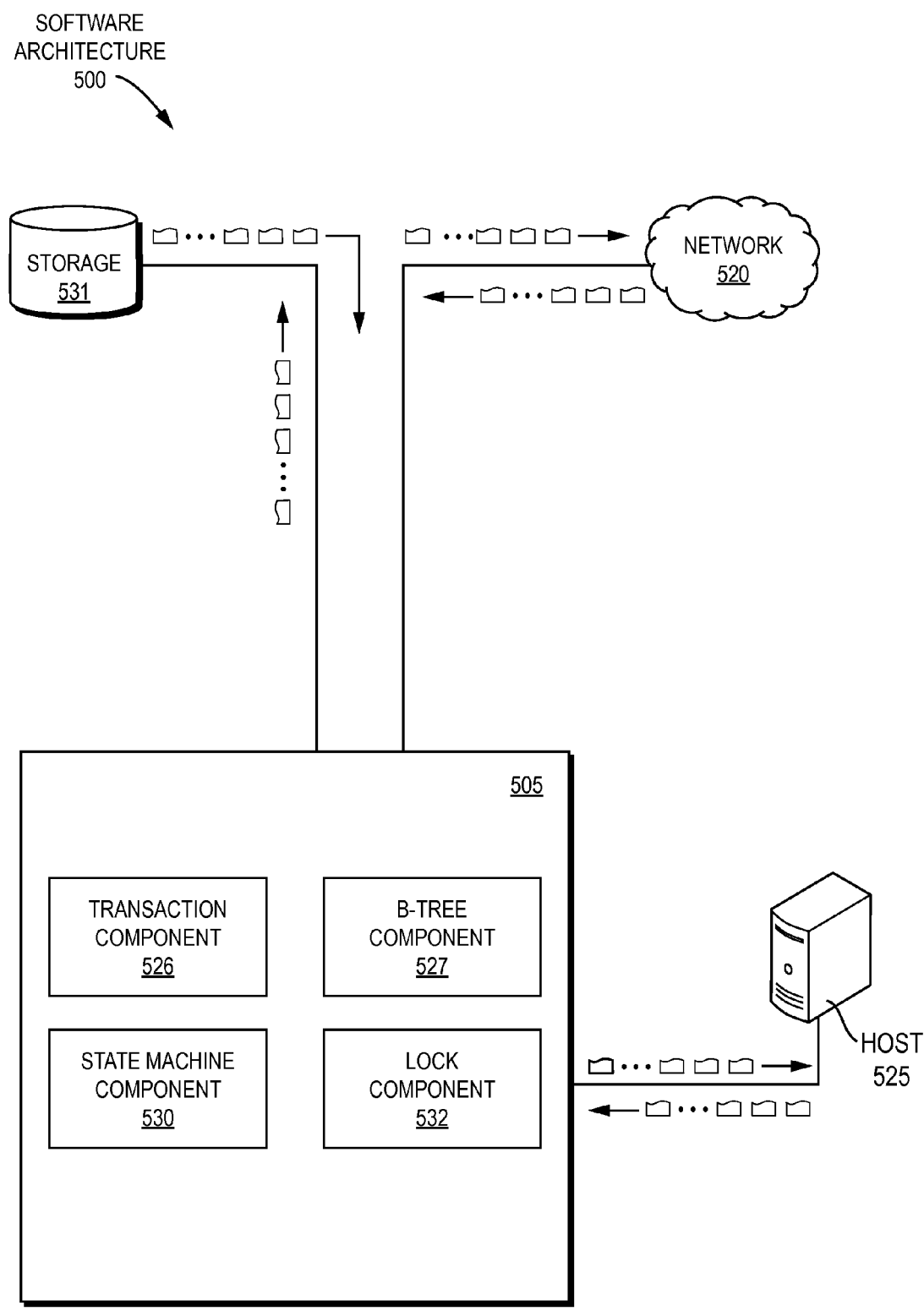
FIG. 5 illustrates of software architecture according to one embodiment for efficient rename in a lock-coupled traversal of a B+-tree.

FIG. 5 illustrates of software architecture 500 according to one embodiment for efficient rename in a lock-coupled traversal of a B+-tree. As illustrated in FIG. 5, efficient renaming engine 505 includes a transaction component 526, a B+-tree component 527, a state machine component 530, and a lock component 532. Also illustrated in FIG. 5 is a host 525, a storage 531 and a network 520.

Data in the form of messages such as lock requests, states, lock grants, lock denials and/or the like may be transmitted from, to and among components of the efficient rename engine 505. In one embodiment, storage 531 may one or more database instances running locally, remotely and/or provisioned as a service, e.g., DBSaaS. Similarly, the network may be in communication with various (remote) devices with different access rights to storage 531.

Efficient rename engine may further include a transaction component 526. Transaction component serves to create transactions (e.g., requests to read/write data) for efficient rename in a B+-tree. The B-tree component 527 may search, create, insert, delete, and/or modify the B-trees and their respective nodes. The state machine component 530 may create one or more state machines configured to request locks on various nodes in the B-tree and/or to perform traversals of execution paths. In one embodiment, the lock component 532 may receive lock requests and transmit grants to specific locks or specific nodes within the B-tree. The lock component 532 may also deny requests to a specific lock in the B-tree depending on whether another state machine currently holds a lock to one of the nodes in the execution path.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method, comprising:
representing a namespace of a file system in a single tree structure, the single tree structure being formed of a plurality of nodes, at least some nodes representing respective filenames in the file system;
for each node, the node holding a key of a respective filename; and
renaming a first key with a second key in the single tree structure using lock coupling, including:
locking a subject node and the parent node;
holding in a first state machine a lock of the parent node;
traversing the single tree structure, beginning from the subject node, using lock coupling and searching for the first key and second keys;
upon divergence of the first and second keys, generating a first path and a second path as two independent paths of traversal of the single tree structure, wherein each of the two independent paths of the single tree structure are traversed concurrently, such that the traversal of the first path is independent from the concurrent traversal of the second path, by:
creating a second state machine traversing the single tree structure, beginning from the subject node, using lock coupling and searching for the first key;
creating a third state machine traversing the single tree structure, beginning from the parent node of the subject node, using lock coupling and searching for the second key, wherein the third state machine traverses the single tree structure concurrently with the second state machine, such that two independent paths from the subject node to succeeding nodes in respective paths of traversal by the second and third state machines result, and the first state machine waits until the second and third state machines complete;
comparing the first and second keys against a minimum key for each node in the respective paths of traversal;
determining whether the first and second keys diverge at a given node;
upon determining the first and second keys diverge at the given node, creating separate execution paths for traversal; and
determining traversal completion of an execution path upon locking a leaf index node.

2. The method of claim 1 wherein the single tree structure is a B+Tree.

3. The method of claim 1, further comprising:
requesting, by the second state machine, a lock from the first state machine for at least one node along at least one execution path prior to modifying the at least one node; and
granting to the second state machine the lock for the at least one node along the at least one execution path prior to modifying the at least one node.

4. The method of claim 1, further comprising:
queuing one or more additional state machines behind the first state machine until the first state machine releases the lock for the parent node.

5. The method of claim 1, further comprising:
generating a first additional state machine and assigning to the first additional state machine a current lock of the given node;
generating a second additional state machine and assigning to the second additional state machine a lock of a parent node of the given node;
the first and second additional state machines being assigned respective ones of the separate execution paths for traversal,
wherein state machine of the parent node of the given node transitions to a pending state waiting for the first additional state machine and the second additional state machine to complete traversal.

6. The method of claim 5, further comprising
storing an address of a locked leaf node in the state machine of a parent node to the leaf node;
checking, by at least one of the two additional state machines, whether an address for a requested locked leaf node is held by the other state machine; and
preventing a deadlock by returning control to the leaf node's parent state machine without attempting to lock the address of the locked leaf node.

7. The method of claim 5, further comprising:
upon traversal completion of the second and third state machine, transferring control to the first state machine;
modifying a namespace by deleting the first key and inserting the second key; and
moving a data pointer from the first key to the second key, wherein moving the data pointer includes referencing a memory address associated with the second key.

8. The method of claim 7, further comprising:
releasing locks held on the nodes of the first and second keys after moving the data pointer from the first key to the second key.

9. A computer system, comprising:
a file system stored in memory, a namespace of the file system being represented in a single tree structure, the single tree structure being formed of a plurality of nodes, at least some nodes representing respective filenames in the file system, and for each node, the node holding a key of a respective filename; and a processor configured to rename a first key with a second key in the single tree structure using lock coupling, wherein the processor is configured to:

lock a subject node and the parent node;

hold in a first state machine a lock of the parent node;

traverse the single tree structure, beginning from the subject node, using lock coupling and searching for the first key and second keys;

upon divergence of the first and second keys, generate a first path and a second path as two independent paths of traversal of the single tree structure, wherein each of the two independent paths of the single tree structure are traversed concurrently, such that the traversal of the first path is independent from the concurrent traversal of the second path, by:

create a second state machine traversing the single tree structure, beginning from the subject node, using lock coupling and searching for the first key;

create a third state machine traversing the single tree structure, beginning from the parent node of the subject node, using lock coupling and searching for the second key, wherein the third state machine traverses the single tree structure concurrently with the second state machine, such that two independent paths from the subject node to succeeding nodes in respective paths of traversal by the second and third state machines result, and the first state machine waits until the second and third state machines complete;

compare the first and second keys against a minimum key for each node in the respective paths of traversal;

determine whether the first and second keys diverge at a given node;

upon determining the first and second keys diverge at the given node, create separate execution paths for traversal; and determine traversal completion of an execution path upon locking a leaf index node.

10. The computer system of claim 9, wherein:

the single tree structure is a B+Tree; and the processor is further configured to:

request, by the second state machine, a lock from the first state machine for at least one node along at least one execution path prior to modifying the at least one node; and grant to the second state machine the lock for the at least one node along the at least one execution path prior to modifying the at least one node.

11. The computer system of claim 9, wherein the processor is further configured to:

queue one or more additional state machines behind the first state machine until the first state machine releases the lock for the parent node.

12. The computer system of claim 9, wherein the processor is further configured to:

generate a first additional state machine and assigning to the first additional state machine a current lock of the given node;

generate a second additional state machine and assigning to the second additional state machine a lock of a parent node of the given node;

assign the first additional state machine and the second additional state machine respective ones of the separate execution paths for traversal, wherein the processor transitions a state machine of the parent node of the given node to a pending state waiting for the first additional state machine and the second additional state machine to complete traversal.

13. The computer system of claim 12, wherein the processor is further configured to:

store an address of a locked leaf node in the state machine of a parent node to the leaf node;

check, by at least one of the two additional state machines, whether an address for a requested locked leaf node is held by the other state machine; and prevent a deadlock by returning control to the leaf node's parent state machine without attempting to lock the address of the locked leaf node.

14. The computer system of claim 12, wherein the processor is further configured to:

upon traversal completion of the second and third state machine, transfer control to the first state machine;

modify a namespace by deleting the first key and inserting the second key; and move a data pointer from the first key to the second key, wherein moving the data pointer includes referencing a memory address associated with the second key.

15. The computer system of claim 14, wherein the processor is further configured to:

release locks held on the nodes of the first and second keys after moving the data pointer from the first key to the second key.

16. A computer program product executed by a processor in communication with a file system, the computer program product comprising:

a non-transitory computer readable medium, the computer readable medium comprising program instructions which, when executed by the processor causes:

representing a namespace of said file system in a single tree structure, the single tree structure being formed of a plurality of nodes, at least some nodes representing respective filenames in the file system;

for each node, the node holding a key of a respective filename; and renaming a first key with a second key in the single tree structure using lock coupling, including:

locking a subject node and the parent node;

holding in a first state machine a lock of the parent node;

traversing the single tree structure, beginning from the subject node, using lock coupling and searching for the first key and second keys;

upon divergence of the first and second keys, generating a first path and a second path as two independent paths of traversal of the single tree structure, wherein each of the two independent paths of the single tree structure are traversed concurrently, such that the traversal of the first path is independent from the concurrent traversal of the second path, by:

creating a second state machine traversing the single tree structure, beginning from the subject node, using lock coupling and searching for the first key;

creating a third state machine traversing the single tree structure, beginning from the parent node of the subject node, using lock coupling and searching for the second key, wherein the third state machine traverses the single tree structure concurrently with the second state machine, such that two independent paths from the subject node to succeeding nodes in respective paths of traversal by the second and third state machines result, and the first state machine waits until the second and third state machines complete;

comparing the first and second keys against a minimum key for each node in the respective paths of traversal;

determining whether the first and second keys diverge at a given node;

upon determining the first and second keys diverge at the given node, creating separate execution paths for traversal; and determining traversal completion of an execution path upon locking a leaf index node.

* * * * *